No. 777,293. PATENTED DEC. 13, 1904.
A. H. MARKS.
VEHICLE TIRE.
APPLICATION FILED JAN. 2, 1904.
NO MODEL.
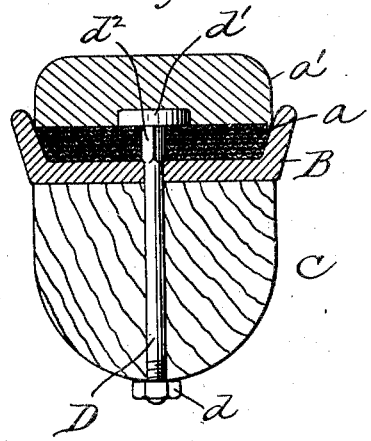
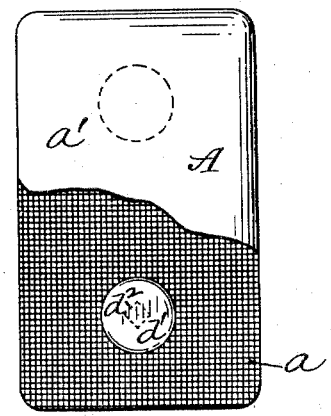
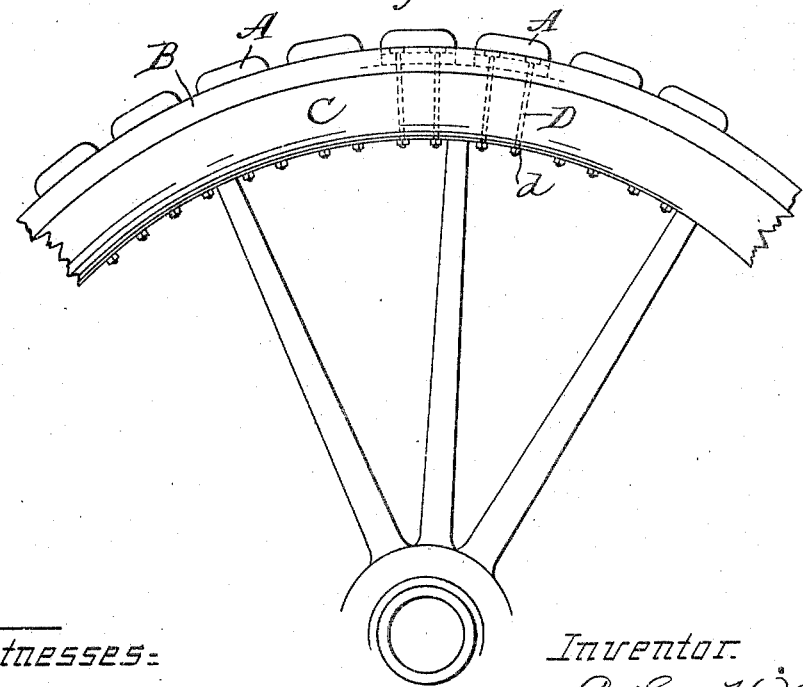
Witnesses:
A. L. Lord.
J. B. Hull
Inventor:
Arthur H. Marks,
By his Attorneys,
Thurston & Bates.

No: 777,293.

Patented December 13, 1904.

UNITED STATES PATENT OFFICE.

ARTHUR H. MARKS, OF AKRON, OHIO.

VEHICLE-TIRE.

SPECIFICATION forming part of Letters Patent No. 777,293, dated December 13, 1904.

Application filed January 2, 1904. Serial No. 187,491. (No model.)

*To all whom it may concern:*

Be it known that I, ARTHUR H. MARKS, a citizen of the United States, residing at Akron, in the county of Summit and State of Ohio, have invented a certain new and useful Improvement in Vehicle-Tires, of which the following is a full, clear, and exact description, reference being had to the accompanying drawings.

The object of this invention is to produce a durable and efficient rubber-pad tire.

The advantages of individual pads, including their ease of replacement when worn, have long been known, but they have not proved satisfactory, because the individual pads are subjected to such strains in use that they are frequently torn from the wheel.

By the present invention I provide independently resilient pads and mechanism for very efficiently holding them on the wheel-rim.

The invention comprises the means employed to this end, consisting, primarily, of rectangular pads each having a base made of a plurality of superimposed layers of woven-wire fabric and a tread portion made of resilient rubber which extends into and fills the interstices between the wires of such wire fabric, this pad being held in place by a bolt and nut, one member of which is vulcanized into the pad.

The invention comprises also the more specific embodiments of these features as herein shown and described.

In the drawings, Figure 1 is a transverse sectional view of a tire embodying my invention. Fig. 2 is a plan of an individual pad, being partly broken away just above its base portion. Fig. 3 is a side view of a section of a wheel-rim equipped with this invention.

Referring to the parts by letters, A represents one of the tire-pads, which consists of a base $a$, formed of a plurality of superimposed layers of woven-wire fabric, and a tread portion $a'$, made of resilient rubber, which is applied to the base in an unvulcanized condition, the rubber being caused by pressure to flow into and fill the interstices between the wires of the base. By this means the tread and base after vulcanization are immutably interlocked and a very firm structure results.

The pads occupy a channel-shaped rim B, which is shown as surrounding a wood felly C, the pads being retained in place by bolts D, having nuts $d$. One member of the bolt and nut retainer is embedded within the tire directly above the woven-wire base and is securely held therein by the subsequent vulcanization of the whole pad. As shown, this member is the bolt itself, whose head $d'$ rests upon the upper surface of the base $a$. Beneath this head is a squared shank $d^2$, which, seating in the wire base, prevents the bolt turning.

As shown, two of the bolts D are employed for each pad, the bolts passing through both the channel-shaped rim and the felly. This makes a very strong and efficient retaining device. By having the bolt entirely covered by the tread portion $a'$ of the pad the wear which would be caused by grit getting in between the bolt and adjacent rubber if the bolt were exposed is eliminated, while by having the bolt draw down directly onto the woven-wire-fabric base the pad is held in the channel-rim in a much more secure manner than would be the case if the bolt simply drew on rubber.

I claim—

1. A rubber tire, composed of rectangular pads each having a tread portion, and a base portion built up for substantially its full height of a series of superimposed woven-wire fabrics which extend substantially the full width of the tire, the tread portion being made of resilient rubber which projects into and fills the interstices between the wires of the base portion.

2. A rubber tire, composed of pads each having a tread portion, and a base portion built up for substantially its full height of a series of superimposed woven-wire fabrics which extend substantially the full width of the base portion, the tread portion being made of resilient rubber which projects into and fills the interstices between the wires of the base portion, combined with a channel-shaped rim in which said pads seat, with the ends of the wire fabrics substantially abutting the inner walls of the channel.

3. A rubber tire, composed of pads each having a tread portion, a base portion built up of a series of superimposed woven-wire fabrics which extend substantially the full width of the base portion, the tread portion being made of resilient rubber which projects into and fills the interstices between the wires of the base portion, combined with a channel-shaped rim in which said pads seat, with the ends of the wire fabrics substantially abutting the inner walls of the channel, and a retainer for holding the pads in place, consisting of a bolt and nut, one member of said retainer being vulcanized within the resilient portion of the pad and bearing upon the upper surface of said base.

In testimony whereof I hereunto affix my signature in the presence of two witnesses.

ARTHUR H. MARKS.

Witnesses:
D. GALEHOUSE,
H. A. MACKUSICK.